Figures 1, 2:
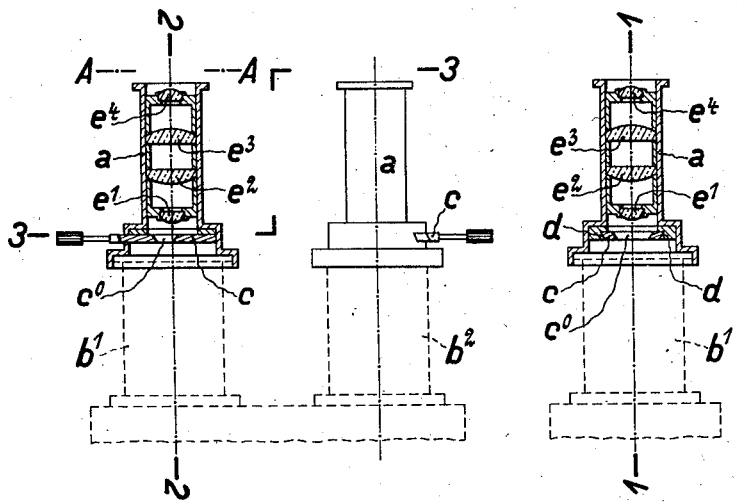

June 21, 1927.

H. SIEDENTOPF 1,632,930

ADDITIONAL DEVICE FOR BINOCULAR MICROSCOPES WITH ONE OBJECTIVE

Filed Sept. 22, 1925   2 Sheets-Sheet 1

Inventor:
Henry Siedentopf

Patented June 21, 1927.

1,632,930

UNITED STATES PATENT OFFICE.

HENRY SIEBENTOPF, OF JENA, GERMANY, ASSIGNOR TO FIRM OF CARL ZEISS, OF JENA, GERMANY.

ADDITIONAL DEVICE FOR BINOCULAR MICROSCOPES WITH ONE OBJECTIVE.

Application filed September 22, 1925, Serial No. 57,926, and in Germany October 16, 1924.

In a binocular microscope with one objective the restriction, required for the effect of the spatial image, of the ray pencil systems, entering the one or the other eye of the observer, to such rays which for the one eye only emanate from the one and for the other eye only from the other half of the entrance pupil of the objective, may, according to a well-known suggestion of Abbe, be brought about by disposing an eccentric diaphragm in the plane of the exit pupils of the two oculars behind each ocular. However, the use of these diaphragms is connected with a disturbance inasmuch as the observer should also bring his eye pupils into this plane. According to the invention this disturbance may be obviated by the use of an additional device, consisting of an astronomical telescope for each of the two oculars which telescope is to be slipped on the ocular and in front of whose objective is disposed an eccentric diaphragm. With a suitable construction of the additional device this diaphragm is disposed, when the device is in use, in the plane of the exit pupil of the respective ocular and the telescope produces behind the telescope a real image of this diaphragm, in the plane of which image the observer may now easily bring his eye-pupil. In order to then attain, if no value be attached to the effect of the spatial image, a binocular observation in the erect image which is free from the loss of light caused by the diaphragms, the latter are suitably made displaceable. The eccentricity of the diaphragm need not consist in this that it releases an aperture which lies eccentrically with the ocular axis but the solely essential eccentricity of the intensity-centres of the effective pencils may, e. g., also be brought about by the insertion of a transparent plate of unilaterally increasing absorption. If it be desired, to affect the magnification yielded by the microscope itself by the additional device, the telescope-magnifying power will be caused to be different from one.

As is well known, some observers, when working with binocular optical instruments, prefer that kind of instrument in which the optical axes of the two oculars are parallel to each other and consequently the axis of the eyes must have the same position, whilst other observers are better able to work with convergent axes. Hence, one suitably disposes at least one of the attachable telescopes rotatable about an axis which is approximately perpendicular to the plane determined by the optical axes of the two oculars. By correspondingly choosing the limits of rotation, it is then possible to observe with a convergence of the axis of the eyes which is variable down to zero.

Figure 3:
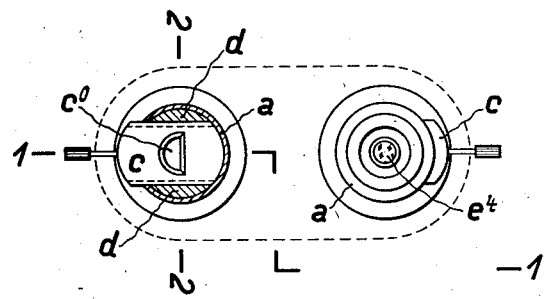
Figure 4:
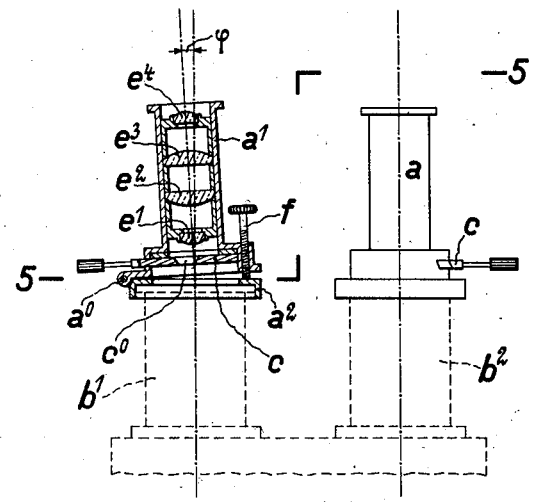
Figure 5:
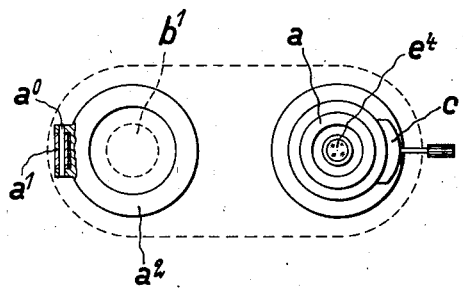

In the accompanying drawing the invention is illustrated by two examples. Of the first example Fig. 1 shows a longitudinal view, partly in a section, Fig. 2 a longitudinal section on the line 2—2 of Fig. 1 and Fig. 3 a section on line 3—3 of Fig. 1. Of the second example Fig. 4 shows a longitudinal view, partly in a section, and Fig. 5 a section on the line 5—5 of Fig. 4.

In a casing $a$, which is capable of being slipped on the one ocular of the binocular microscope, there is supported a disc-diaphragm $c$ in guides $d$. The front surface of the diaphragm $c$ lies in the plane of the exit pupil of the ocular $b^1$. The aperture $c^0$ of the diaphragm is a semicircle whose straight delimitation, on the diaphragm being inserted (as shown in the drawing), is struck by the axis of the casing $a$. Four collective lenses, $e^1$, $e^2$, $e^3$ and $e^4$ disposed in the casing $a$, form two Ramsden oculars $e^1$, $e^2$, and $e^3$, $e^4$, facing each other and being so disposed that the focal plane of the ocular $e^1$, $e^2$, lying on the side of the lens $e^2$, coincides with the focal plane of the ocular $e^3$, $e^4$, lying on the side of the lens $e^3$. Thereby the lens $e^1$ agrees with the lens $e^4$ and the lens $e^2$ with the lens $e^3$ and the distance apart of the lenses $e^1$ and $e^2$ is equal to that of the lenses $e^3$ and $e^4$. Hence, these four lenses form an astronomical telescope with the magnifying power one. The front surface of the diaphragm $c$ lies in the focal plane of the ocular $e^1$, $e^2$ on the side of the lens $e^1$. Consequently this diaphragm is imaged by the four lenses in the plane A—A (which coincides with the focal plane of the ocular $e^3$, $e^4$, lying on the side of the lens $e^4$), i. e. at a place which is easily accessible to the eye-pupil of the observer. In exactly the same way as the device, slipped in the drawing on the ocular $b^1$, the one slipped on the other ocular $b^2$ of the microscope is assumed to be constructed.

If, whilst renouncing the effect of the spatial image it be desired to observe without loss of light, the diaphragms $c$ must be pulled out of the casings $a$.

In the second example the one of the two telescopes has a two-parted casing $a^1$, $a^2$; both parts are united by a joint $a^0$. The upper part $a^1$ again contains four lenses $e^1$, $e^2$, $e^3$ and $e^4$ and a displaceable disc-diaphragm $c$ with an aperture $c^0$. For these lenses and the diaphragm the conditions cited in the first example hold good. The telescope also has accordingly the magnifying power one. The lower part $a^2$ is adapted to be slipped on the one ocular $b^1$ of a binocular microscope. For the adjustment of an inclination $\alpha$ of the optical telescope axis relatively to the optical axis of this ocular $b^1$ serves a screw $f$ with a milled head. The device slipped on the other ocular $b^2$, which has a single casing $a$, is preferably alike the one described in the first example.

For the use of the device the axis of the joint $a^0$ must be so disposed as to lie on the outside of the microscope and to be perpendicular to the plane determined by the optical axes of the oculars $b^1$ and $b^2$. By rotating the screw $f$ the inclination $\alpha$ of the telescope may be adjusted to the peculiarity of the observer at any one time and it assumes the value zero if the screw $f$ be screwed back until the contact of the screw $f$ with the part of the casing $a^2$ ceases. If the axis of this telescope be inclined to the ocular axis by the angle $\varphi$, a ray which, coinciding with the ocular axis, emanates from the ocular, emerges from the telescope in such a way as to be further inclined in its turn to the telescope axis by the angle $\varphi$. This is due to the fact that the telescope is a reversing telescope, having the magnifying power "one". Hence, the ray emerging from the telescope is inclined to the ocular axis by the angle $2\varphi$. Consequently the axes of the eye of the observer, if the latter observes with each eye the point lying in the microscope axis, have the convergence $2\varphi$.

I claim:

1. Additional device for binocular microscopes with one objective, consisting of a pair of astronomical telescopes of like magnifying power, a fastening device for each of the telescopes mounted on the telescope, adapted to fit over the ocular of a microscope, and an eccentric diaphragm disposed in front of the objective of the telescope.

2. Additional device for binocular microscopes with one objective, consisting of a pair of astronomical telescopes of like magnifying power, a fastening device for each of the telescopes mounted on the telescope, adapted to fit over the ocular of a microscope, and a displaceable eccentric diaphragm disposed in front of the objective of the telescope.

3. Additional device for binocular microscopes with one objective, consisting of a pair of astronomical telescopes of like magnifying power, a fastening device for each of the telescopes mounted on the telescope, adapted to fit over the ocular of a microscope, an eccentric diaphragm disposed in front of the objective of the telescope, at least in one of the telescopes a joint, forming part of the said device, and an adjusting screw, adapted to displace the telescope about an axis, which perpendicularly intersects a plane through the optical telescope axes.

HENRY SIEDENTOPF.